(12) United States Patent
Nonaka et al.

(10) Patent No.: US 10,268,048 B2
(45) Date of Patent: Apr. 23, 2019

(54) PROJECTOR

(71) Applicant: SEIKO EPSON CORPORATION, Tokyo (JP)

(72) Inventors: Toshiyuki Nonaka, Shimosuwa-Machi (JP); Hirofumi Kasuga, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 3 days.

(21) Appl. No.: 15/478,779

(22) Filed: Apr. 4, 2017

(65) Prior Publication Data
US 2017/0299883 A1    Oct. 19, 2017

(30) Foreign Application Priority Data

Apr. 15, 2016    (JP) ................... 2016-081822

(51) Int. Cl.
  *H04N 9/31*    (2006.01)
  *G02B 27/64*   (2006.01)
  *G03B 21/14*   (2006.01)

(52) U.S. Cl.
  CPC ......... *G02B 27/646* (2013.01); *G03B 21/142* (2013.01); *H04N 9/3191* (2013.01); *G03B 2205/0007* (2013.01)

(58) Field of Classification Search
  CPC ............... G02B 27/646; G03B 21/142; G03B 2205/0007
  USPC .................................................. 359/554, 555
  See application file for complete search history.

(56) References Cited

U.S. PATENT DOCUMENTS

| 5,107,293 A * | 4/1992 | Sekine ..................... G02B 7/36 348/208.99 |
| 5,635,725 A * | 6/1997 | Cooper ................ G02B 27/646 250/559.29 |
| 2011/0181636 A1 | 7/2011 | Fukazawa |
| 2015/0277104 A1 | 10/2015 | Hino |

FOREIGN PATENT DOCUMENTS

| JP | 2010-102064 A | 5/2010 |
| JP | 2011-154073 A | 8/2011 |
| JP | 5287748 B2 | 9/2013 |
| JP | 2015-187678 A | 10/2015 |

* cited by examiner

*Primary Examiner* — Evan P Dzierzynski
*Assistant Examiner* — Mitchell T Oestreich
(74) *Attorney, Agent, or Firm* — Oliff PLC

(57) ABSTRACT

A projector that projects image light on a projection surface and including a light modulator that modulates light emitted from a light source to form the image light, an optical path deflecting section that changes the projection direction of the image light modulated with the light modulator, a projection system that projects the image light outputted from the optical path deflecting section on the projection surface, a vibration detecting section that detects vibration acting on the projector, and an optical path deflection controlling section that controls the amount of change in the projection direction deflected by the optical path deflecting section based on the vibration detected by the vibration detection section.

3 Claims, 9 Drawing Sheets

PROJECTOR

The entire disclosure of Japanese Patent Application No. 2016-081822, filed Apr. 15, 2016 is expressly incorporated by reference herein.

BACKGROUND

1. Technical Field

The present invention relates to a projector.

2. Related Art

In recent years, there is a known technology for detecting vibration acting on an image display apparatus and correcting a blur (shake) of a projected image.

For example, there is a known technology in which an optical axis correction lens provided immediately upstream of a projection lens is moved in accordance with vibration acting on an image display apparatus to correct a blur of an image projected by the image display apparatus (JP-A-2011-154073, for example).

The technology described in JP-A-2011-154073 is suitable for a projector including a lens having a small volume and a light weight, for example, a portable projector. It is, however, difficult in some cases to adapt the technology described in JP-A-2011-154073 to a projector including a lens having a large volume and a heavy weight, such as a high-luminous-flux projector.

Further, in the case of a projector including a lens having a large volume and a heavy weight, the projector is required to be provided with a motor capable of moving the lens. The motor is in some cases a motor having a large volume. The technology described in JP-A-2011-154073 therefore has a difficulty reducing the size of the projector main body in some cases.

Further, a projector is in some cases so configured that a lens is changed in accordance with the condition of the image projection environment. In this case, it is in some cases difficult to reduce the amount of effort to adjust the action of moving a lens in use on a lens basis.

Therefore, in the case of a projector including a lens having a large volume and a heavy weight or a projector having a configuration in which a lens is changed in accordance with a condition under which the projector is used, the technology described in JP-A-2011-154073 has in some cases a difficulty reducing vibration acting on the projector.

SUMMARY

An advantage of some aspects of the invention is to provide a projector that corrects a blur of an image in accordance with vibration acting on the projector.

An aspect of the invention is directed to a projector that projects image light on a projection surface and includes a light modulator that modulates light emitted from a light source to form the image light, an optical path deflecting section that changes a projection direction of the image light modulated with the light modulator, a projection system that projects the image light outputted from the optical path deflecting section on the projection surface, a vibration detecting section that detects vibration acting on the projector, and an optical path deflection controlling section that controls an amount of change in the projection direction deflected by the optical path deflecting section based on the vibration detected by the vibration detection section.

With this configuration, the projector changes the amount of change in the projection direction of the image light deflected by the optical path deflecting section on the basis of the vibration acting on the projector. The projector can therefore correct a blur of an image in accordance with the vibration acting on the projector.

As another aspect of the invention, the projector may be configured such that the optical path deflection controlling section controls the amount of change in the projection direction deflected by the optical path deflecting section based on the vibration in a case where the vibration is greater than or equal to a first threshold, whereas the optical path deflecting section changes the projection direction of the image light alternately to a first direction and a second direction in a case where the vibration is smaller than the first threshold.

With this configuration, in the case where the magnitude of the vibration acting on the projector is greater than or equal to the first threshold, the projector controls the amount of change in the projection direction of the image light deflected by the optical path deflecting section on the basis of the magnitude of the vibration acting on the projector. On the other hand, in the case where the magnitude of the vibration acting on the projector is smaller than the first threshold, the optical path deflecting section in the projector changes the projection direction of the image light alternately to the first direction and the second direction. As a result, when the magnitude of the vibration is large, the projector can correct a blur of an image in accordance with the vibration, and when the magnitude of the vibration is small, the projector can practically increase the number of pixels that form an image for an increase in the resolution of the image.

As another aspect of the invention, the projector may be configured such that the optical path deflecting section includes an optical member that deflects light in accordance with a posture of the optical member and a driver that changes the posture of the optical member.

With this configuration, the driver changes the posture of the optical member on the basis of the vibration acting on the projector. As a result, the projector can correct a blur of an image in accordance with the vibration acting on the projector.

As another aspect of the invention, the projector may be configured to further include a posture adjusting section that changes a posture of the optical path deflecting section based on the vibration in a case where the vibration is greater than or equal to a second threshold.

With this configuration, in the case where the magnitude of the vibration acting on the projector is greater than or equal to the second threshold, the posture of the optical path deflecting section is changed on the basis of the vibration acting on the projector. As a result, even when large vibration acts on the projector, the projector can correct a blue of an image in accordance with the vibration acting on the projector.

As described above, the projector changes the amount of change in the projection direction of the image light deflected by the optical path deflecting section on the basis of vibration acting on the projector. As a result, the projector can correct a blue of an image in accordance with the vibration acting on the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

A first embodiment of the invention will be described in detail with reference to the drawings.

First Embodiment

Configuration of Projector

The configuration of a projector 1 according to a first embodiment will be described below with reference to FIG. 1.

Figure 1:
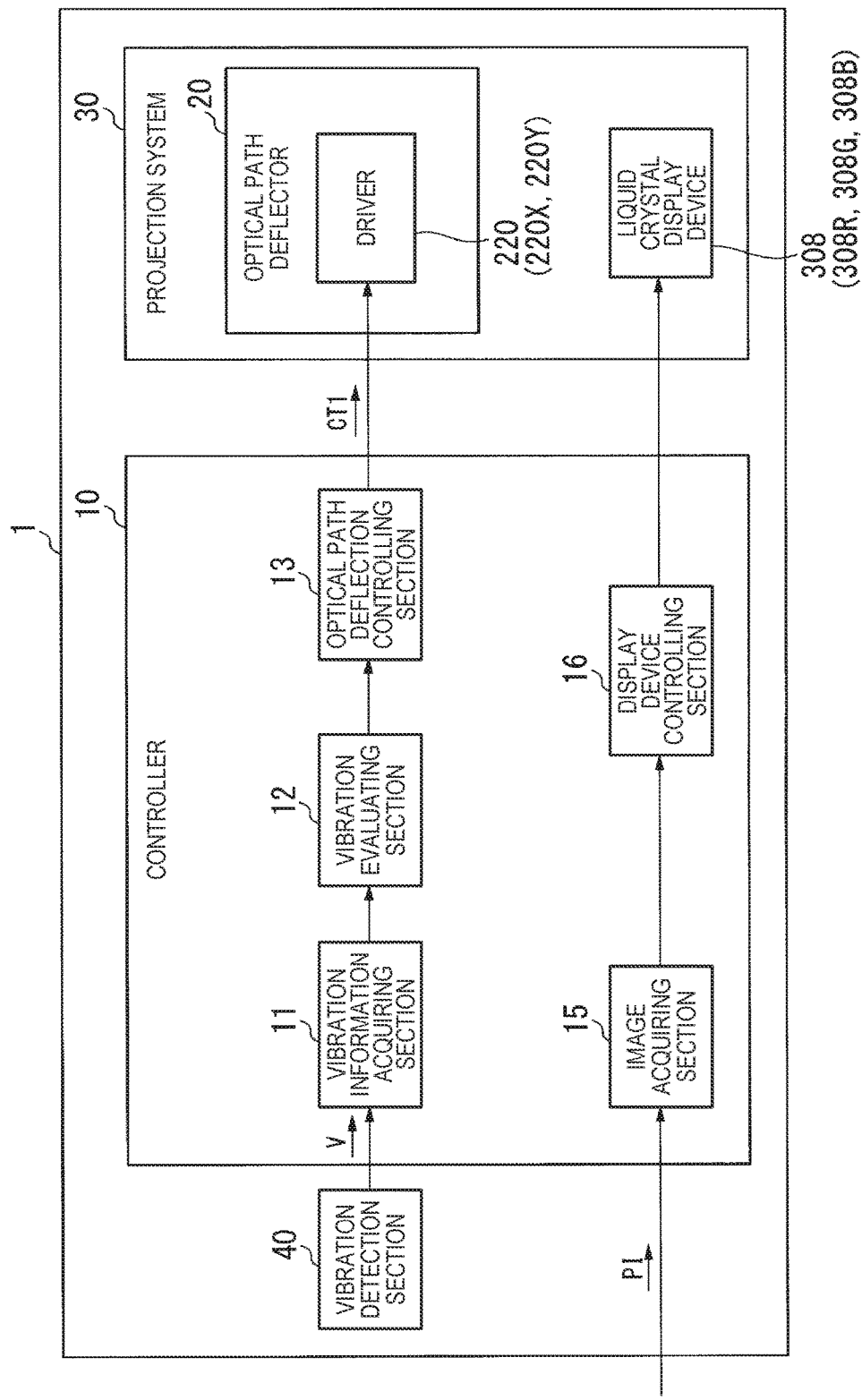
FIG. 1 shows an example of the configuration of a projector according to a first embodiment.

FIG. 1 shows an example of the configuration of the projector 1 according to the first embodiment.

The projector 1 includes a controller 10, a projection system 30, and a vibration detecting section 40.
Vibration Detecting Section The vibration detecting section 40 is a detector that detects vibration acting on the projector 1. The vibration detection section 40 is, for example, a vibration sensor. The vibration detecting section 40 outputs vibration information V, which is a result of the detection of vibration, to the controller 10.

The vibration information V contains displacement information DP and direction information DR. The displacement information DP is information representing the distance over which the projector 1 moves due to the vibration acting on the projector 1. The direction information DR is information representing the direction of the vibration acting on the projector 1.

The vibration detecting section 40 detects vibration acting on the projector 1 on a continuous or regular basis.
Projection System The projection system 30 includes a plurality of functional sections for image projection. Among the sections provided in the projection system 30, an optical path deflector 20 and liquid crystal display devices 308R, 308G, and 308B are controlled by the controller 10. Lateral drivers 220X and longitudinal drivers 220Y, which are provided in the optical path deflector 20, are also controlled by the controller 10.

The optical path deflector 20 is a device that deflects the traveling direction of light projected by the projector 1 on a projection surface. The optical path deflector 20 is an example of an optical path deflecting section. In the following description, light projected by the projector 1 on the projection surface and representing an image to be projected is also referred to as image light.

The lateral drivers 220X and the longitudinal drivers 220Y are driven under the control of the controller 10 to change the traveling direction of the image light deflected by the optical path deflector 20 and the magnitude of the deflection. In the following description, the traveling direction of the image light deflected by the optical path deflector 20 and the magnitude of the deflection are also referred to as the amount of change in the projection direction of the image light deflected by the optical path deflector 20. The lateral drivers 220X and the longitudinal drivers 220Y are therefore driven under the control of the controller 10 to change the amount of change in the projection direction of the image light deflected by the optical path deflector 20.

In the following description, in a case where the lateral drivers 220X and the longitudinal drivers 220Y are not distinguished from each other, they are collectively referred to as a driver 220.

The liquid crystal display devices 308R, 308G, and 308B modulate, under the control of the controller 10, light emitted from a light source provided in the projection system 30 and incident on the liquid crystal display devices 308R, 308G, and 308B. The liquid crystal display device 308R modulates red light, the liquid crystal display device 308G modulates green light, and the liquid crystal display device 308B modulates blue light. In the following description, in a case where the liquid crystal display devices 308R, 308G, and 308B are not distinguished from one another, they are collectively referred to as a liquid crystal display device 308. The liquid crystal display device 308 is an example of alight modulator. The projection system 30 will be described later in detail.
Controller The controller includes a CPU (central processing unit) and includes, as functional sections of the CPU, a vibration information acquiring section 11, a vibration evaluating section 12, an optical path deflection controlling section 13, an image acquiring section 15, and a display device controlling section 16.

The image acquiring section 15 externally receives, via an input port, image information PI representing an image to be projected by the projector 1. The input port complies, for example, with DVI, HDMI (registered trademark), or SDI. The image acquiring section 15 acquires the image information PI via the input port and outputs the acquired image information PI to the display device controlling section 16.

The display device controlling section 16 controls the liquid crystal display devices 308R, 308G, and 308B, which are provided in the projection system 30, on the basis of the image information PI acquired from the image acquiring section 15. The display device controlling section 16 performs image formation control in which an image represented by the image information PI supplied from the image acquiring section 15 is formed in image formable regions of the liquid crystal display devices 308R, 308G, and 308B on the basis of the image information PI.

The vibration information acquiring section 11 acquires the vibration information V from the vibration detection section 40. The vibration information acquiring section 11 outputs the acquired vibration information V to the vibration evaluating section 12.

The vibration evaluating section 12 acquires the vibration information V from the vibration information acquiring section 11. The vibration evaluating section 12 determines the magnitude of the vibration represented by the vibration information V acquired from the vibration information acquiring section 11. The vibration evaluating section 12, when it determines that the vibration represented by the vibration information V is greater than or equal to a first threshold, outputs the vibration information V to the optical path deflection controlling section 13. On the other hand, the vibration evaluating section 12, when it determines that the vibration represented by the vibration information V is smaller than the first threshold, does not output the vibration information V to the optical path deflection controlling section 13.

The optical path deflection controlling section 13 changes drive operation control performed on the driver 220 on the basis of whether or not the vibration acting on the projector 1 is greater than or equal to the first threshold. When the vibration acting on the projector 1 is greater than or equal to the first threshold, the optical path deflection controlling section 13 controls the driver 220 to cause it to move the image light projected by the projector 1 to a position where the vibration acting on the projector 1 is canceled. When the vibration acting on the projector 1 is smaller than the first threshold, the optical path deflection controlling section 13 controls the driver 220 to cause it to project the image light projected by the projector 1 at high resolution.

The first threshold is a threshold of the distance represented by the displacement information DP contained in the vibration information V. Specifically, the first threshold is a distance that causes a decrease in the quality of an image projected by the projector 1 when the projector 1 moves over the distance due to the vibration acting on the projector 1.

Control Performed by Optical Path Deflection Controlling Section: For Correction of Vibration Acting on Projector When the vibration acting on the projector 1 is determined to be greater than or equal to the first threshold, the optical path deflection controlling section 13 acquires the vibration information V from the vibration evaluating section 12.

When the vibration acting on the projector 1 is determined to be greater than or equal to the first threshold, the optical path deflection controlling section 13 controls the amount of change in the projection direction of the image light deflected by the optical path deflector 20 on the basis of the vibration acting on the projector. The optical path deflection controlling section 13 controls the drive operation performed by the driver 220 in such a way that the amount of change in the image light deflected by the optical path deflector 20 is so changed that the image light is projected in a position where the vibration acting on the projector 1 is canceled.

The optical path deflection controlling section 13 outputs a first control signal CT1, which controls the drive operation performed by the driver 220 in such a way that the image light is projected in a position where the vibration acting on the projector 1 is canceled.

Control Performed by Optical Path Deflection Controlling Section: For Projection of Image at High Resolution When the vibration acting on the projector 1 is determined to be smaller than the first threshold, the optical path deflection controlling section 13 does not acquire the vibration information V from the vibration evaluating section 12.

In this case, the optical path deflection controlling section 13 controls the drive operation performed by the driver 220 in such a way that the image light projected by the projector 1 is projected on the projection surface at high resolution.

The optical path deflection controlling section 13 outputs the first control signal CT1 that controls the drive operation performed by the driver 220 in such a way that the image light projected by the projector 1 is projected on the projection surface at high resolution.

Details of Projection System

The projection system 30 will be described below in detail with reference to FIG. 2.

Figure 2:
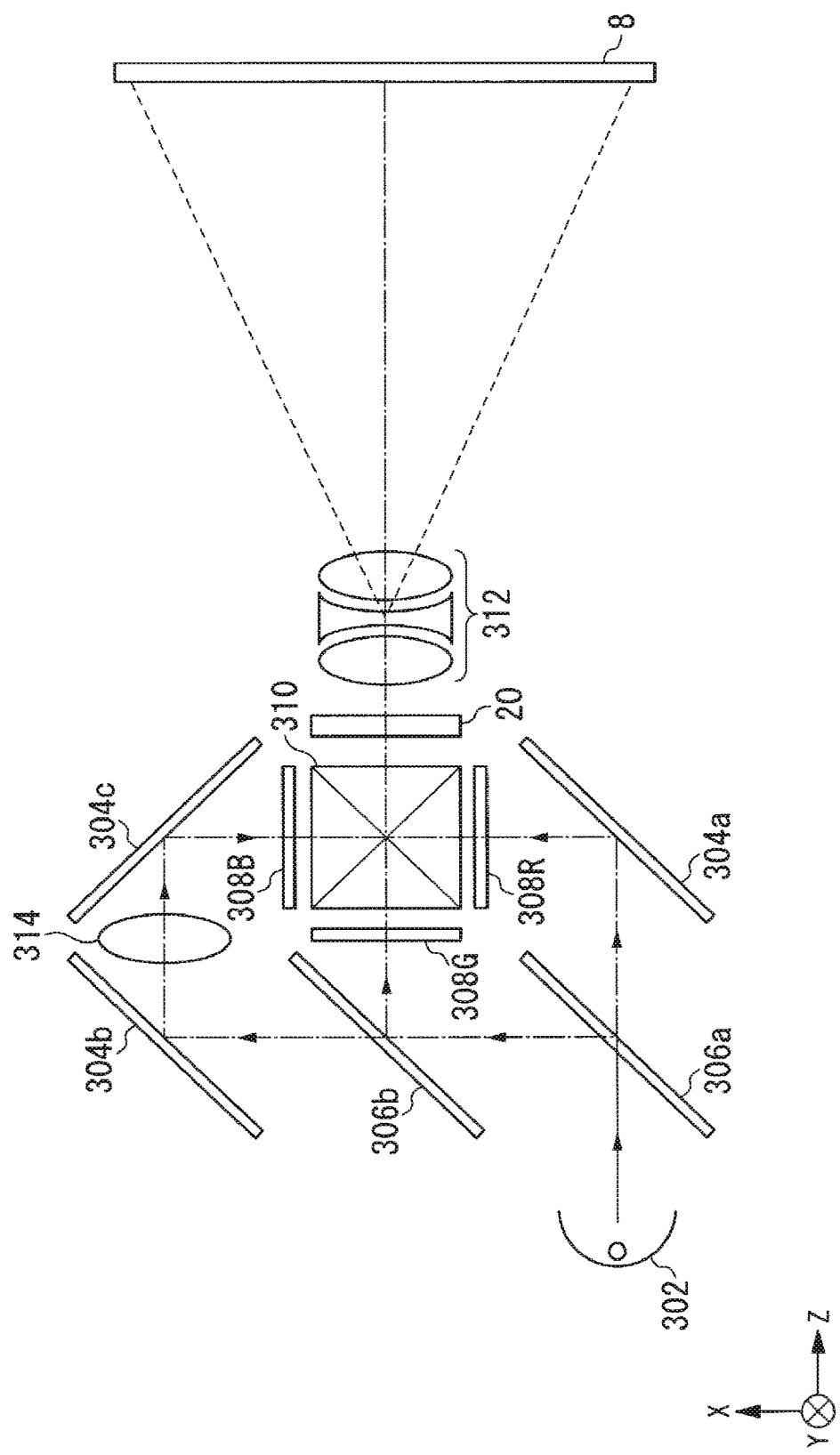
FIG. 2 shows an example of the configuration of a projection system in the first embodiment.

FIG. 2 shows an example of the configuration of the projection system 30 in the first embodiment.

The orthogonal coordinate system shown in FIG. 2 will now be described. The X axis represents the lateral direction of the projector 1. The Y axis represents the longitudinal direction of the projector 1. The Z axis represents the frontward/rearward direction of the projector 1. In the following description, the X-axis direction is also referred to as the lateral direction. The positive X-axis direction is also referred to as a rightward direction, and the negative X-axis direction is also referred to as a leftward direction. In the following description, the Y-axis direction is also referred to as the longitudinal direction. The positive Y-axis direction is also referred to as a downward direction, and the negative Y-axis direction is also referred to as an upward direction. In the following description, the Z-axis direction is also referred to as a frontward/rearward direction. The positive Z-axis direction is also referred to as a frontward direction, and the negative Z-axis direction is also referred to as a rearward direction.

The projection system 30 includes a light source 302, three mirrors 304a, 304b, and 304c, two dichroic mirrors 306a and 306b, the three liquid crystal display devices 308R, 308G, and 308B, a dichroic prism 310, the optical path deflector 20, a projection lens system 312, and a relay lens 314.

The light source 302 is, for example, a halogen lamp, a mercury lamp, a light emitting diode (LED), or a semiconductor laser. A light source that emits white light is used as the light source 302.

The three mirrors 304a, 304b, and 304c have the function of converting the optical path in the projector 1 on the basis of reflection. On the other hand, the two dichroic mirrors 306a and 306b have the function of separating the white light emitted from the light source 302 into R (red) light, G (green) light, and B (Blue) light, which corresponds to the three primary colors, and guiding the separated light fluxes to the respective liquid crystal display devices 308R, 308G, and 308B.

For example, the dichroic mirror 306a, which receives the white light, has the function of transmitting light that belongs to the R wavelength region and reflecting light that belongs to the G and B wavelength regions. The dichroic mirror 306b, which receives the light that is reflected off the dichroic mirror 306a and belongs to the G and B wavelength regions, has the function of transmitting the light that belongs to the B wavelength region and reflecting the light that belongs to the G wavelength region.

The reflection that occurs at the dichroic mirrors 306a and 306b causes the optical path length of the light that belongs to the B wavelength region to be longer than the optical path lengths of the other light fluxes. The discrepancy in the optical path length is corrected by the relay lens 314 provided in a halfway position on the optical path of the light that belongs to the B wavelength region.

Each of the liquid crystal display devices 308R, 308G, and 308B is used as a light modulator, as described above. The liquid crystal display devices 308R, 308G, and 308B are transmissive light modulators corresponding to the RGB primary colors and each have pixels arranged in a matrix formed, for example, of 1080 longitudinal columns and 1920 lateral rows in a rectangular (oblong) pixel area. At each of the pixels, the amount of light that passes through the pixel is adjusted with respect to the light incident thereon, and the light intensity distribution over the pixels is coordinately controlled in the liquid crystal display devices 308R, 308G, and 308B.

Scan lines and data lines (not shown) are so provided that a scan line and a data line are provided in correspondence with each of the pixels in each of the liquid crystal display devices 308R, 308G, and 308B. Further, pixel electrodes are provided in correspondence with the intersections of the scan lines and the data lines, and a common electrode is so provided as to face the pixel electrodes (neither of the electrodes is shown). A liquid crystal (not shown) material is disposed between the pixel electrodes and the common electrode.

In addition, each of the liquid crystal display devices 308R, 308G, and 308B is provided with a polarizer that is not shown. When one of the scan lines is selected and voltages across the data lines are applied to the pixel electrodes on the scan line, the liquid crystal molecules are oriented in accordance with the applied voltages and polarize the light passing through the liquid crystal molecules. Setting the polarization produced by the liquid crystal molecules and the arrangement of the polarizer as appropriate allows adjustment of the amount of light passing through each of the liquid crystal display devices on a pixel basis.

The light fluxes spatially modulated by the liquid crystal display devices 308R, 308G, and 308B enter the dichroic prism 310 along three directions. Out of the light fluxes having entered the dichroic prism 310, the light fluxes that belong to the R and B wavelength regions are refracted by 90° and exit out of the dichroic prism 310. On the other hand, the light that belongs to the G wavelength region travels straightforward and exit out of the dichroic prism 310. As a result, the light fluxes having exited out of the dichroic prism 310 form image light containing a full-color image that is the combination of R, G, and B three-primary-color images, and the image light is incident on the optical path deflector 20.

The optical path deflector 20, which will be described later in detail, includes an optical member, and whether or not the light incident on the optical member is deflected (shifted) can be chosen as appropriate. The thus deflected light exits out of the optical path deflector 20 and enters the projection lens system 312. The projection lens system 312 is a compound lens system that is a combination of a plurality of lenses. The projection lens system 312 enlarges the combined image and projects the enlarged image on a projection surface 8.

The vibration detection section 40 is desirably provided in the projection system 30 shown in FIG. 2 and on the dichroic prism 310.

Optical Path Deflector

The optical path deflector 20 will be described below with reference to FIGS. 3 and 4.

Figure 3:
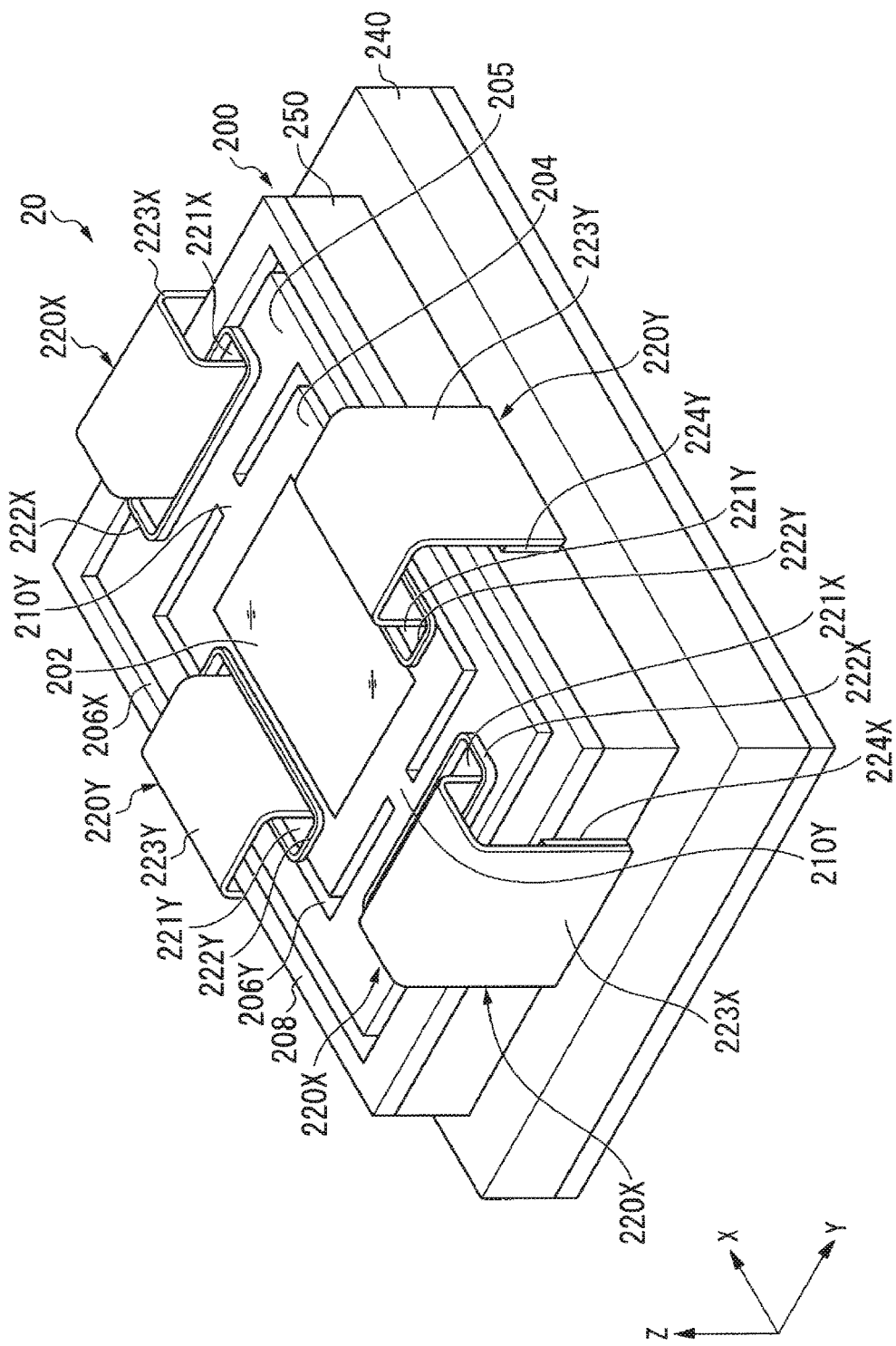
FIG. 3 is a perspective view showing an example of the configuration of an optical path deflector in the first embodiment.

FIG. 3 is a perspective view showing an example of the configuration of the optical path deflector 20 in the first embodiment.

Figure 4:
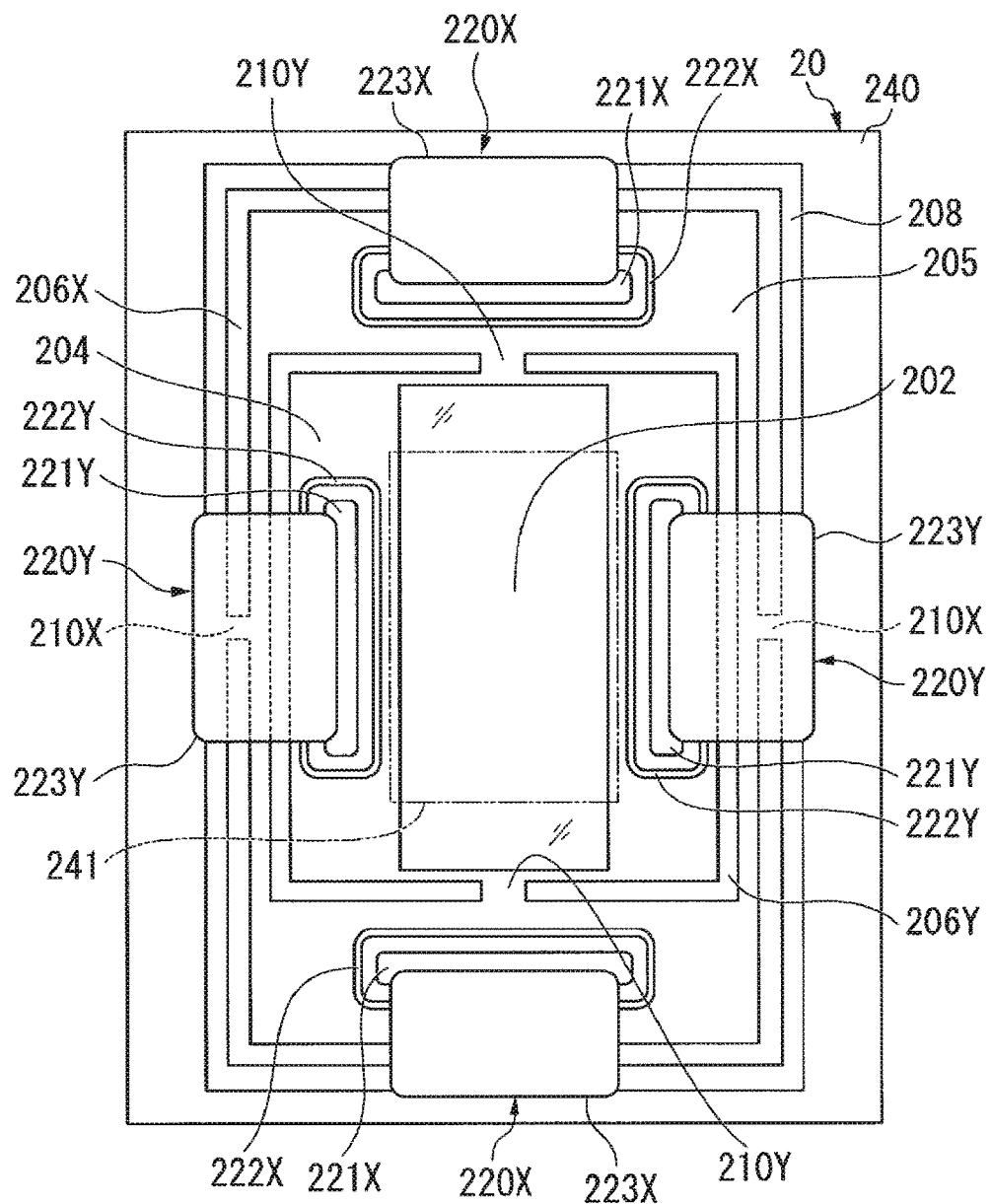
FIG. 4 is a top view showing the example of the configuration of the optical path deflector in the first embodiment.

FIG. 4 is a top view showing the example of the configuration of the optical path deflector 20 in the first embodiment.

The orthogonal coordinate system shown in FIGS. 3 and 4 has the same definition on the directions as those in the orthogonal coordinate system shown in FIG. 2.

The optical path deflector 20 includes an optical member 202, which deflects light, a first frame section 204, which surrounds the side surface of the optical member 202, a second frame section 205, which separates from the first frame section 204 via longitudinal gaps 206Y and surrounds the side surface of the first frame section 204, a frame-shaped support section 208, which separates from the second frame section 205 via lateral gaps 206X and surrounds the side surface of the second frame section 205, longitudinal shaft sections 210Y, which are so provided as to link the first frame section 204 to the second frame section 205, and lateral shaft sections 210X, which are so provided as to link the second frame section 205 to the support section 208. Among the components described above, the optical member 202 is swung around the lateral shaft sections 210X and the longitudinal shaft sections 210Y, which serve as the axis of swing motion, so that the posture of the optical member 202 changes. When the posture of the optical member 202 changes, the exiting direction of the light having passed through the optical member 202 changes (position of optical path changes). The combined image light from the dichroic prism 310 can therefore be deflected in an arbitrary direction.

In the following description, the optical member 202, the first frame section 204, the second frame section 205, the support section 208, the lateral shaft sections 210X, and the longitudinal shaft sections 210Y described above are collectively referred to as an optical path deflection functional section 200.

The optical path deflector 20 includes the lateral drivers 220X and the longitudinal drivers 220Y, which cause the optical member 202 to swing to change the posture of the optical member 202. The optical path deflector 20 causes the optical member 202 to swing by using drive force produced by the lateral drivers 220X and the longitudinal drivers 220Y.

The optical path deflector 20 further includes a base 240, which is provided in a position downstream of the optical path deflection functional section 200, and a spacer 250, which is provided between the optical path deflection functional section 200 and the base 240.

Optical Path Deflection Functional Section

The optical member 202 is formed of a light transmissive plate-shaped body. The light incident on the optical member 202 travels straightforward depending on the angle of incidence and passes through the optical member 202. The light incident on the optical member 202 is refracted depending on the angle of incidence and passes through the optical member 202. The direction in which the light having passed through the optical member is deflected and the magnitude of the deflection of the light having passed through the optical member can be controlled by changing the posture of the optical member 202 in such a way that a target angle of incidence is achieved.

The material of which the optical member 202 is made is, for example, any of a variety of crystalline materials, such as crystallized quartz and sapphire, any of a variety of glass materials, such as borosilicate glass and quartz glass, or any of a variety of resin materials, such as a polycarbonate-based resin and an acrylic resin. Among the materials described above, an inorganic material is preferably used. An inorganic material lowers the elasticity of the optical member 202. That is, an inorganic material increases the rigidity, whereby uneven deflection of an image deflected by the optical member 202 is suppressed.

The optical member 202 has a rectangular shape. The size and orientation of the optical member 202 in a plan view are so set as appropriate that the image light having exited out of the cross dichroic prism 310 is allowed to pass through the optical member 202.

The first frame section 204 and the second frame section 205 are so provided as to surround the side surface of the optical member 202. The first frame section 204 and the second frame section 205 are made of an elastic material having elasticity greater than that of the material of which the optical member 202 is made. The first frame section 204 and the second frame section 205, which are made of the material described above, can minimize transformation of stress induced therein by vibration into unnecessary vibration of the optical member 202 itself. That is, the configuration in which the first frame section 204 and the second frame section 205, which are elastic, surround the side surface of the optical member 202 can reduce stress induced in the optical member 202 when the posture of the optical member 202 is changed, whereby unnecessary vibration produced in the optical member 202 in accordance with the stress distribution therein can be reduced to a small amount. As a result, an undesirable situation in which an image deflected by the optical member 202 is deflected in an unintended direction can be avoided.

Outside the first frame section 204, the second frame section 205 is so provided as to surround the side surface of the first frame section 204 via the longitudinal gaps 206Y. The first frame section 204 and the second frame section 205 are connected to each other via the two longitudinal shaft sections 210Y. Outside the second frame section 205, the frame-shaped support section 208 is so provided as to surround the side surface of the second frame section 205 via the lateral gaps 206X. The second frame section 205 and the support section 208 are connected to each other via the two lateral shaft sections 210X.

The second frame section 205 is supported by the support section 208 via the two lateral shaft sections 201X. The first frame section 204 is supported by the second frame section 205 via the two longitudinal shaft sections 210Y. Therefore, the first frame section 204 and the optical member 202 are allowed to swing around the straight line passing through the lateral shaft sections 210X, which serves as an axis of swing motion, and further allowed to swing around the straight line passing through the longitudinal shaft sections 210Y, which serves as another axis of swing motion.

The first frame section 204, the second frame section 205, the support section 208, the lateral shaft sections 210X, and the longitudinal shaft sections 210Y may be separate sections and bonded to each other but are preferably formed as an integral part. The portions where the first frame section 204, the second frame section 205, the lateral shaft sections 210X, and the longitudinal shaft sections 210Y are connected to each other and the portions where the support section 208, the lateral shaft sections 210X, and the longitudinal shaft section 210Y are connected to each other therefore have high impact resistance and high long term durability.

The material of which the lateral shaft sections 210X, and the longitudinal shaft sections 210Y are made is the elastic material described above of which the first frame section 204 and the second frame section 205 are made.

Further, the material of which the support section 208 is made is not limited to a specific material and may be a material other than a resin material but is preferably a resin material. In the case where the first frame section 204, the second frame section 205, the lateral shaft sections 210X, and the longitudinal shaft sections 210Y are formed integrally with the support section 208, the support section 208 is made of the elastic material described above of which the first frame section 204 and the second frame section 205 are made.

The elastic material is not limited to a specific material and may be any material that is more elastic than the material of which the optical member 202 is made, and a material primarily made of a resin is preferably used. A material containing a resin allows the sections that surround the optical member 202 to be sufficiently more elastic than the material of which the optical member 202 is made, whereby the effect described above and provided by the first frame section 204 and the second frame section 205 is enhanced.

The two lateral shaft sections 210X are provided in positions corresponding to the two opposite long sides of the optical member 202. The two lateral shaft sections 210X are configured to be parallel to the Y axis.

The two longitudinal shaft sections 210Y are provided in positions corresponding to the two opposite short sides of the optical member 202. The two longitudinal shaft sections 210Y are configured to be parallel to the X axis.

That is, the axes of swing motion around which the first frame section 204, the second frame section 205, and the optical member 202 swing are axes parallel to the X axis and the Y axis.

The two lateral shaft sections 210X and the two longitudinal shaft sections 210Y are preferably disposed in positions where they are symmetric with respect to the center of the optical member 202 in a plan view. In the configuration described above, the swing motion is performed in well balanced manner, whereby the optical member 202 is allowed to stably swing, and image deflection behavior is also stabilized. As a result, the projector 1 can stably project a high-resolution image.

The above description has been made with reference to the case where the first frame section 204 is configured to surround the entire side surface of the optical member 202, but not necessarily, and the first frame section 204 may instead face, for example, part of the optical member 202.

Further, the above description has been made with reference to the case where each of the second frame section 205 and the support section 208 has a frame-like shape, but not necessarily, and they may have arbitrary shapes that allow the lateral shaft sections 210X and the longitudinal shaft sections 210Y to be connected thereto.

The optical member 202 and the first frame section 204 may be glued to each other by using an arbitrary method and are glued to each other, for example, with an adhesive. The adhesive is, for example, an epoxy-based adhesive, an acrylic adhesive, or a silicon-based adhesive.

Lateral Drivers and the Longitudinal Drivers

Each of the lateral drivers 220X includes a through hole 221X, which passes through the second frame section 205 in the frontward/rearward direction, an annular coil 222X, which is so placed on the second frame section 205 to surround the through hole 221X, a core 223X, which is placed on the upper surface of the base 240 and inserted through the through hole 221X, and a magnet 224X, which is so provided as to be adjacent to the core 223X.

Each of the longitudinal drivers 220Y includes a through hole 221Y, which passes through the first frame section 204 in the frontward/rearward direction, an annular coil 222Y, which is so placed on the first frame section 204 to surround the through hole 221Y, a core 223Y, which is placed on the upper surface of the base 240 and inserted through the through hole 221Y, and a magnet 224Y, which is so provided as to be adjacent to the core 223Y.

The through holes 221X are holes each having an elongated opening and formed in the vicinities of the two short sides of the second frame section 205 and in parallel to the short sides. The through holes 221Y are holes each having an elongated opening and formed in the vicinities of the two long sides of the first frame section 204 and in parallel to the long sides. The opening of each of the through holes 221X and 221Y has a rectangular shape (oblong shape), but not necessarily. The cores 223X are inserted through the through holes 221X, and the cores 223Y are inserted through the through holes 221Y. In this case, it is preferable that the cores 223X are not in contact with the inner surfaces of the through holes 221X. Similarly, it is preferable that the cores 223Y are not in contact with the inner surfaces of through holes 221Y.

It is therefore desirable that a gap is always present between each of the through holes 221X and the corresponding core 223X in the process of swing motion of the optical member 202. It is similarly desirable that a gap is always present between each of the through holes 221Y and the corresponding core 223Y in the process of swing motion of the optical member 202.

The coils 222X are glued to the upper surface of the second frame section 205. The coils 222Y are glued to the upper surface of the first frame section 204. Each of the coils 222X and 222Y has an annular shape. The coils 222X are so configured that the annular shape of the coils 222X roughly coincides with the shape of the openings of the through holes 221X. The coils 222Y are so configured that the annular shape of the coils 222Y roughly coincides with the shape of the openings of the through holes 221Y.

Each of the cores 223X and 223Y is a plate-shaped, partially bent magnetic core. The cores 223X are so provided as to extend over portions of the short sides of the frame-shaped support section 208. The cores 223Y are so provided as to extend over portions of the long sides of the frame-shaped support section 208.

The cores 223X and 223Y are made of a soft magnetic material, for example, pure ion, soft ferrite, or permalloy.

Movement of Optical Member Under Control of Coil

The coils 222X and 222Y are connected to a voltage applicator that is not shown.

The magnets 224X are so disposed as to be adjacent to the cores 223X. When the voltage applicator applies voltage to the coils 222X, magnetic fields are produced in the vicinities of the coils 222X. The cores 223X produce frontward/rearward driving magnetic force in accordance with the direction in which the voltage is applied to the coils 222X and the direction of the magnetic fields produced by the magnets 224X. The magnetic force rotates the second frame section 205 and the optical member 202 in the frontward/rearward direction around the lateral shaft sections 210X.

The magnets 224Y are so disposed as to be adjacent to the cores 223Y. When the voltage applicator applies voltage to the coils 222Y, magnetic fields are produced in the vicinities of the coils 222Y. The cores 223Y produce frontward/rearward driving magnetic force in accordance with the direction in which the voltage is applied to the coils 222Y and the direction of the magnetic fields produced by the magnets 224Y. The magnetic force rotates the first frame section 204 and the optical member 202 in the frontward/rearward direction around the lateral shaft sections 210Y.

When the voltage applicator applies voltage to each of the coils 222X and 222Y, magnetic fields are produced in the vicinities of the coils 222X and 222Y. The four vertices of the first frame section 204 and the optical member 202, the upper right vertex, the lower right vertex, the upper left vertex, and the lower left vertex, rotate in the frontward/rearward direction in accordance with the direction in which the voltage is applied to each of the coil 222X and the coil 222Y and the direction of the magnetic field produced by each of the magnets 224X and 224Y.

Specifically, the first frame section 204 and the optical member 202 rotate in the frontward/rearward direction around the axis perpendicular to the straight line connecting the upper right vertex to the lower left vertex of the first frame section 204 and the optical member 202 depending on the direction in which the voltage is applied to each of the coils 222X and 222Y. Similarly, the first frame section 204 and the optical member 202 rotate in the frontward/rearward direction around the axis perpendicular to the straight line connecting the lower right vertex to the upper left vertex of the first frame section 204 and the optical member 202 depending on the direction in which the voltage is applied to each of the coils 222X and 222Y.

Each of the magnets 223X and 224Y is formed, for example, of a permanent magnet. The permanent magnet is, for example, a neodymium magnet, a ferrite magnet, a samarium cobalt magnet, or an Alnico magnet.

As described above, the lateral drivers 220X and the longitudinal drivers 220Y are driven to change the amount of change in the projection direction in which the image light passing through the optical member 202 is deflected. That is, the image light passing through the optical path deflector 20 is so changed by driving the lateral drivers 220X and the longitudinal drivers 220Y that the position of the image light projected on the projection surface 8 changes. The driver 220 is driven on the basis of the first control signal CT1 outputted from the optical path deflection controlling section 13.

The above-mentioned driver 220 using magnetic force is an example of the driver, and the driver 220 can be replaced with a driver that uses a different method to drive the first frame section 204 and the optical member 202. The different method, is for example, piezoelectric driving.

The position of the driver 220 and the number of drivers 220 are not limited to those in the aspect of the present embodiment.

Drive Operation Performed by Driver: For Correction of Vibration Acting on Projector In the case where the vibration acting on the projector 1 is greater than or equal to the first threshold, the driver 220 is so driven to change the amount of change in the projection direction of the image light deflected by the optical path deflector 20 in accordance with the magnitude of the vibration.

In this case, the optical path deflection controlling section 13 outputs, to the driver 220, the first control signal CT1 that controls the driver 220 in such a way that the image light projected by the projector 1 is moved to a position where the vibration acting on the projector 1 is canceled.

Specifically, the optical path deflection controlling section 13 controls the lateral drives 220X and the longitudinal drivers 220Y on the basis of the first control signal CT1 to change the amount of change in the projection direction of the image light deflected by the optical path deflector 20 in such a way that the position of the image light projected on the projection surface 8 is the position where the vibration acting on the projector 1 is canceled. The position where the vibration acting on the projector 1 is canceled is a position shifted from the position where the image light is normally projected by the distance represented by the displacement information DP contained in the vibration information V in the direction opposite the direction represented by the direction information DR contained in the vibration information V.

Drive Operation Performed by Driver: For Projection of Image at High Resolution

In the case where the vibration acting on the projector 1 is smaller than the first threshold, the driver 220 is so driven to project an image at high resolution.

A pixel group that forms an image deflected by the optical member 202 is typically a set of pixels in which a row of pixels arranged in parallel to the X axis is duplicated along the Y axis. That is, the pixel group is formed of pixels arranged in a matrix in an XY plane. The number of pixels in the pixel group is not limited to a specific number. For example, the pixel group is formed of 1920 X-axis-direction rows and 1080 Y-axis-direction columns.

An image formed of the pixels arranged in a matrix (pixel group) is deflected when passing through the optical member 202, and when the swing axis of the optical member 202 inclines with respect both to the X axis and the Y axis, the image deflection direction also inclines with respect both to the X axis and the Y axis. Therefore, repeating the state in which the image light is projected without the optical path deflected and the state in which the image light is projected with the optical path deflected in the longitudinal and lateral directions by half the interval between the pixels allows a practical increase in the number of pixels of an image in the longitudinal and lateral directions for an increase in the resolution of the projected image.

In the following description, the direction in which the image light is projected without the optical path deflected is referred to as a first direction. Further, in the following description, the direction in which the image light is projected with the optical path so changed as to shift the image light in the longitudinal and lateral directions by half the interval between the pixels is referred to as a second direction.

The amount of shift of the image light is not necessarily half the interval between the pixels. In the above description, in one of the two states, the image light is projected without the optical axis deflected. Instead, the optical path may be deflected both in the two states as long as the projection directions differ from each other by a predetermined amount (half the interval between the pixels, for example).

The optical path deflection controlling section 13 outputs, to the driver 220, the first control signal CT1 that controls the driver 220 in such a way that an image is projected at high resolution.

Base

The base 240 has a plate-like shape, supports the optical path deflection functional section 200, and ensures the mechanical strength of the optical path deflector 20.

The base 240 has a rectangular shape a size greater than the optical path deflection functional section 200 in a plan view, and the edge of the base 240 is configured to lie off the outer edge of the optical path deflection functional section 200. The cores 223X and 223Y described above are connected to the portion that lies off.

The material of which the base 240 is made is, for example, an inorganic material, such as glass, silicon, metal, or ceramics, or an organic material, such as resin.

A through hole 241, which passes through the base 240 in the frontward/rearward direction, is formed in the base 240 in correspondence with the position of the optical member 202. Providing the through hole 241 and disposing the optical path deflector 20 in the through hole 241 allows the image light to pass through the base 240 via the optical path deflector 20.

The shape of the base 240 is not limited to the shape in the aspect of the present embodiment and may be any shape that can support the optical path deflection functional section 200.

Spacer

The spacer 250 is interposed between the optical path deflection functional section 200 and the base 240. The spacer 250 has a frame-like shape, and the inner wall of the spacer 240, the upper surface of the base 240, and the lower surface of the optical path deflection functional section 200 form a space 251 (not shown). The space 251 is a space that permits the swing motion of the first frame section 204, the second frame section 205, and the optical member 202.

The spacer 250 has the same shape and dimension as those of the optical path deflection functional section 200. The shape of the spacer 250 is not limited to a specific shape and may have any shape that can form the space that permits the swing motion of the first frame section 204, the second frame section 205, and other components. For example, the spacer 250 may not have a frame-like shape and may not have the same dimension or shape as that of the optical path deflection functional section 200.

The material of which the spacer 250 is made is, for example, an inorganic material, such as glass, silicon, metal, or ceramics, or an organic material, such as resin.

Action of Projector

The action of the projector 1 will be described below with reference to FIGS. 5 and 6.

Figure 5:
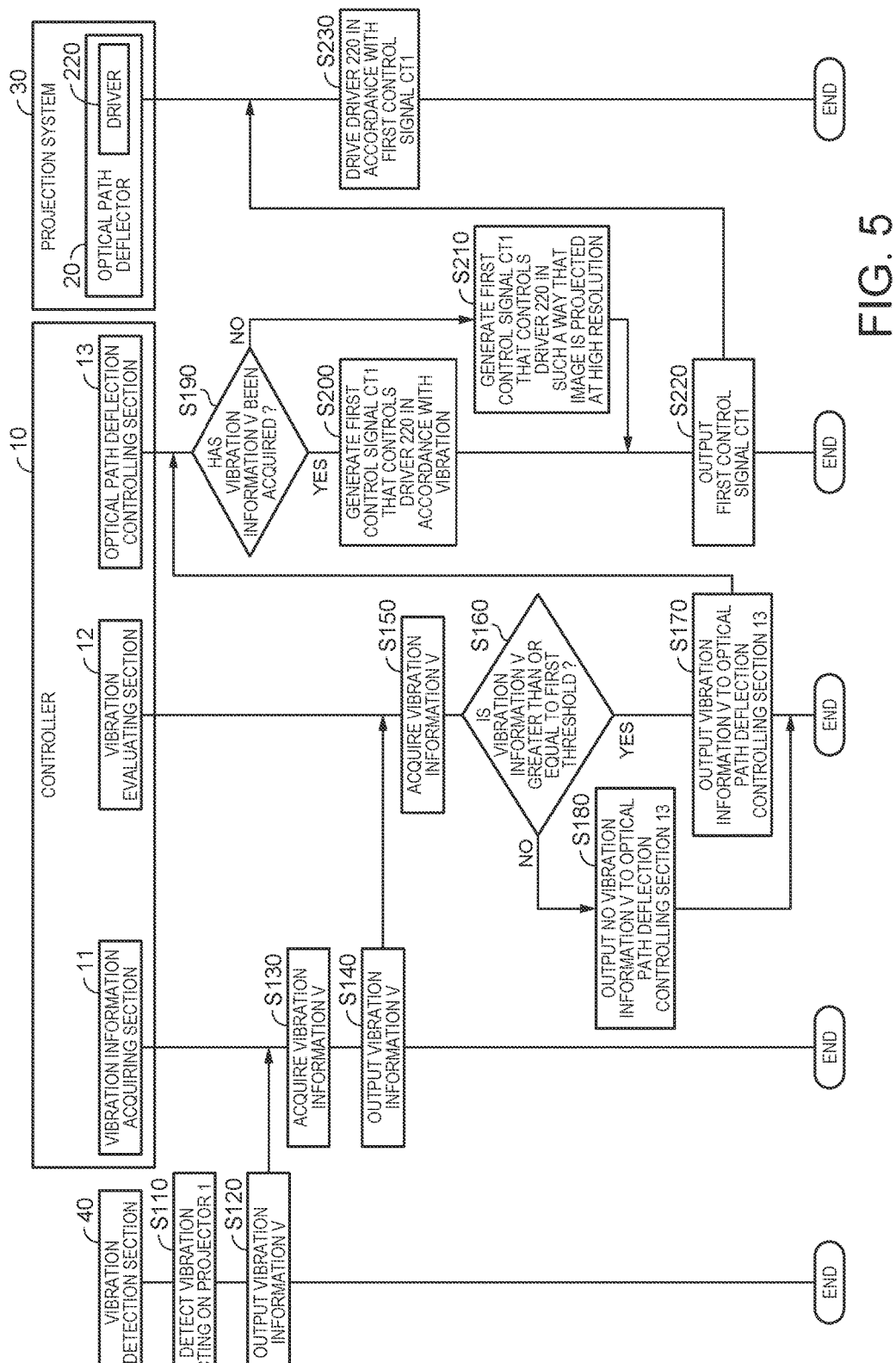
FIG. 5 is a flowchart showing an example of the action of the projector according to control performed on the optical path deflector in the first embodiment.

FIG. 5 is a flowchart showing an example of the action of the projector 1 according to control performed on the optical path deflector 20 in the first embodiment.

The vibration detection section 40 detects vibration acting on the projector 1 (step S110), as shown in FIG. 5. The vibration detection section 40 outputs detected vibration information V to the controller 10 (step S120).

The vibration information acquiring section 11 provided in the controller 10 acquires the vibration information V from the vibration detection section 40 (step S130). The vibration information acquiring section 11 outputs the acquired vibration information V to the vibration evaluating section 12 (step S140).

The vibration evaluating section 12 acquires the vibration information V from the vibration information acquiring section 11 (step S150). The vibration evaluating section 12 evaluates whether or not the vibration information V acquired from the vibration information acquiring section 11 is greater than or equal to the first threshold (step S160). When the vibration information V is greater than or equal to the first threshold (YES in step S160), the vibration evaluating section 12 outputs the vibration information V to the optical path deflection controlling section 13 (step S170). When the vibration information V is smaller than the first threshold (NO in step S160), the vibration evaluating section 12 does not output the vibration information V to the optical path deflection controlling section 13 (step S180).

The optical path deflection controlling section 13 evaluates whether or not the vibration information V has been acquired from the vibration evaluating section 12 (step S190). In the case where the vibration information V has been acquired from the vibration evaluating section 12 (YES in step S190), the optical path deflection controlling section 13 generates the first control signal CT1 that controls the driver 220 in accordance with the vibration acting on the projector 1 (step S200). In the case where the vibration information V has not been acquired from the vibration evaluating section 12 (NO in step S190), the optical path deflection controlling section 13 generates the first control signal CT1 that controls the driver 220 in such a way that an image projected by the projector 1 is projected at high resolution (step S210).

The optical path deflection controlling section 13 outputs the first control signal CT1 to the projection system (step S220).

The driver 220 provided in the optical path deflector 20 in the projection system 30 is driven on the bases of the first control signal CT1 outputted from the optical path deflection controlling section 13 (step S230).

Figure 6:
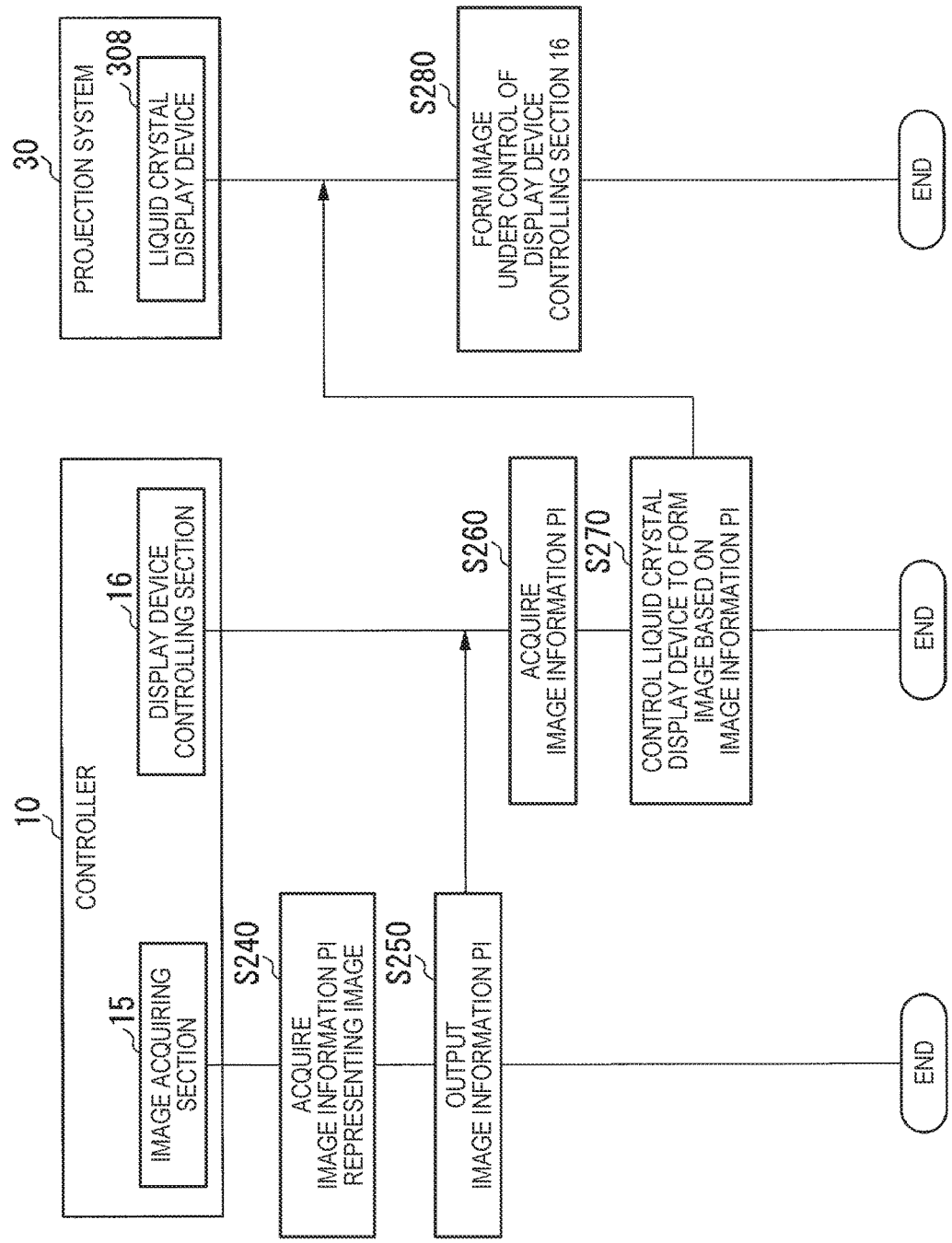
FIG. 6 is a flowchart showing an example of the action of the projector according to control performed on liquid crystal display devices in the first embodiment.

FIG. 6 is a flowchart showing an example of the action of the projector 1 according to the control performed on the liquid crystal display device 308 in the first embodiment.

The image acquiring section 15 acquires the image information PI representing an image through the input port (step S240). The image acquiring section 15 outputs the acquired image information PI to the display device controlling section 16 (step S250).

The display device controlling section 16 acquires the image information PI from the image acquiring section 15 (step S260). The display device controlling section 16 controls the liquid crystal display devices 308 to cause them to each form an image represented by the image information PI on the basis of the acquired image information PI (step S270).

Each of the liquid crystal display elements 308 provided in the projection system 30 forms an image under the control of the display device controlling section 16 (step S280).

Brief of First Embodiment

As described above, a projector according to the present embodiment (projector 1 in an example of the first embodiment) is a projector that projects image light on a projection surface (projection surface 8 in an example of the first embodiment) and includes a light modulator (liquid crystal display device 308 in an example of the first embodiment) that modulates light emitted from a light source to form image light, an optical path deflecting section (optical path deflector 20 in an example of the first embodiment) that changes the projection direction of the image light modulated with the light modulator, a projection system (projection system 30 in an example of the first embodiment) that projects the image light outputted from the optical path deflecting section on the projection surface, a vibration detecting section (vibration detecting section 40 in an example of the first embodiment) that detects vibration acting on the projector, and an optical path deflection controlling section (optical path deflection controlling section 13 in an example of the first embodiment) that controls the amount of change in the projection direction deflected by the optical path deflecting section on the basis of the vibration detected by the vibration detection section.

In the projector according to the present embodiment, the optical path deflection controlling section controls the amount of change in the projection direction deflected by the optical path deflecting section on the basis of the vibration in the case where the vibration is greater than or equal to a first threshold, whereas the optical path deflecting section changes the projection direction of the image light alternately to a first direction and a second direction in the case where the vibration is smaller than the first threshold.

In the projector according to the present embodiment, the optical path deflecting section includes an optical member (optical member 202 in an example of the first embodiment) that deflects light in accordance with the posture of the optical member and a driver (driver 220 in an example of the first embodiment) that changes the posture of the optical member. The driver is so driven under the control of the optical path deflection controlling section that the projection direction deflected by the optical path deflecting section changes.

The projector 1 according to the present embodiment changes control of the driving operation performed on the driver 220 on the basis of whether or not the vibration acting on the projector 1 is greater than or equal to the first threshold. When the vibration acting on the projector 1 is greater than or equal to the first threshold, the projector 1 moves the image light projected by the projector 1 to a position where the vibration acting on the projector 1 is canceled. When the vibration acting on the projector 1 is smaller than the first threshold, the projector 1 projects the image light projected by the projector 1 at high resolution.

The projector 1 according to the present embodiment can therefore correct a blur of an image in accordance with the vibration acting on the projector 1.

Variation

A variation according to the first embodiment will be described below with reference to the drawings.

Figure 7:
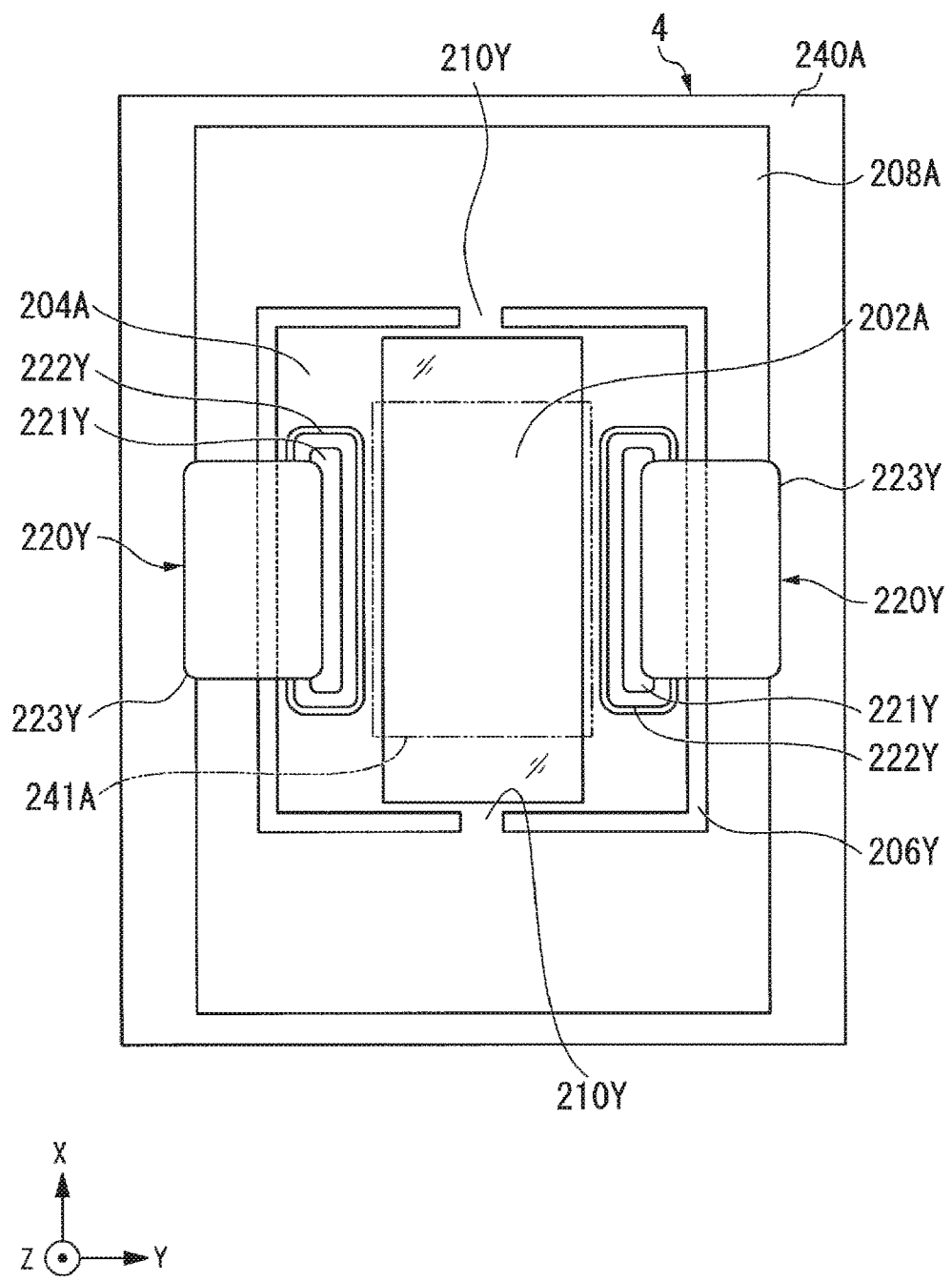
FIG. 7 shows an example of a longitudinal optical path deflector according to a variation.

FIG. 7 shows an example of a longitudinal optical path deflector 4 according to the variation.

Figure 8:
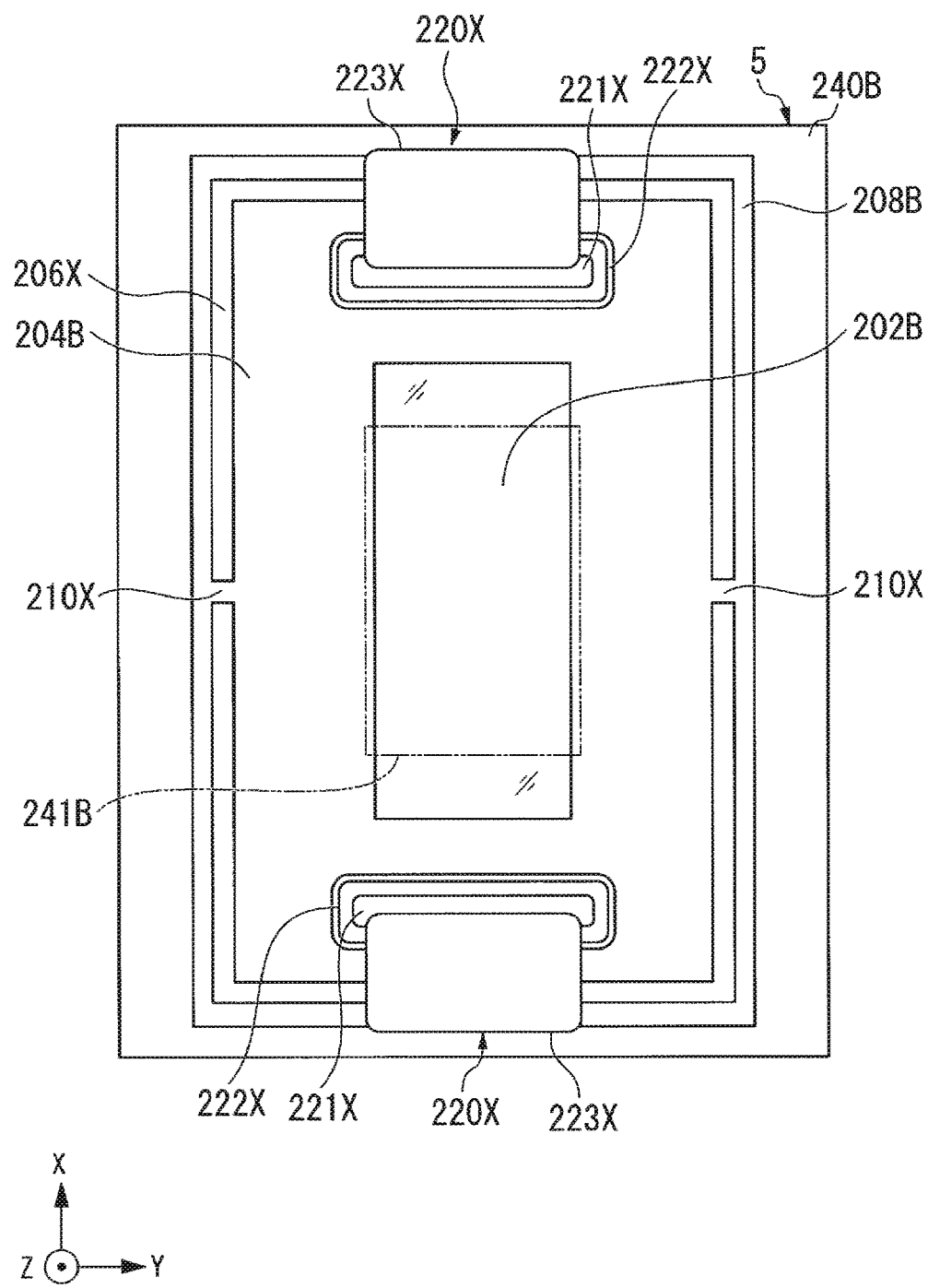
FIG. 8 shows an example of a lateral optical path deflector according to the variation.

FIG. 8 shows an example of a lateral optical path deflector 5 according to the variation.

In the first embodiment, the lateral drivers 220X and the longitudinal drivers 220Y, which are called the driver 220, are formed on the same base 240 and form the integral optical path deflector 20, but not necessarily. For example, the lateral drivers 220X and the longitudinal drivers 220Y may be formed on different bases 240.

An example in which the lateral drivers 220X and the longitudinal drivers 220Y are formed on a base 240A and a base 240B, which are different from each other, respectively will be described below with reference to FIGS. 7 and 8.

The same configurations as those in the first embodiment described above have the same reference characters and will not be described.

The longitudinal optical path deflector 4 includes the following components on the base 240A: an optical member 202A, which deflects light; a frame section 204A, which surrounds the side surface of the optical member 202A; a frame-shaped support section 208A, which is separate from the frame section 204A via longitudinal gaps 206Y and surrounds the side surface of the frame section 204A; and longitudinal shaft sections 210Y, which are so provided as to link the frame section 204A to the support section 208A. A through hole 241A, which passes through the base 240A in the frontward/rearward direction, is formed in the base 240A in correspondence with the position of the optical member 202A. Providing the through hole 241A and disposing the optical member 202A in the through hole 241A allows the image light to pass through the base 240A via the optical member 202A.

Among the components described above, the optical member 202A is swung around the longitudinal shaft sections 210Y, which serve as the axis of swing motion, so that the posture of the optical member 202A changes. When the posture of the optical member 202A changes, the exiting direction of the light having passed through the optical member 202A can be changed (position of optical path can be changed). The combined image light from the dichroic prism 310 can therefore be deflected in the upward/downward direction around the longitudinal shaft sections 210Y.

The lateral optical path deflector 5 includes an optical member 202B, which deflects light, a frame section 204B, which surrounds the side surface of the optical member 202B, a frame-shaped support section 208B, which is separate from the frame section 204B via lateral gaps 206X and surrounds the side surface of the frame section 204B, and lateral shaft sections 210X, which are so provided as to link the frame section 204B to the support section 208B. A through hole 241B, which passes through the base 240B in the frontward/rearward direction, is formed in the base 240B in correspondence with the position of the optical member 202B. Providing the through hole 241B and disposing the optical member 202B in the through hole 241B allow the image light to pass through the base 240B via the optical member 202B.

Among the components described above, the optical member 202B is swung around the lateral shaft sections 210X, which serve as the axis of swing motion, so that the posture of the optical member 202B changes. When the posture of the optical member 202B changes, the exit direction of the light having passed through the optical member 202B can be changed (position of optical path can be changed). The combined image light from the dichroic prism 310 can therefore be deflected in the rightward/leftward direction around the lateral shaft sections 210X.

The longitudinal optical path deflector 4 and the lateral optical path deflector 5 are so disposed as to be layered on each other in the frontward/rearward direction. Further, the optical member 202A, which is provided in the longitudinal optical path deflector 4, and the optical member 202B, which is provided in the lateral optical path deflector 5, are disposed in the positions where the image light having exited out of the dichroic prism 310 is allowed to be projected on the projection surface 8.

Second Embodiment

Configuration of Projector

A second embodiment of the invention will be described below with reference to the drawings.

Figure 9:
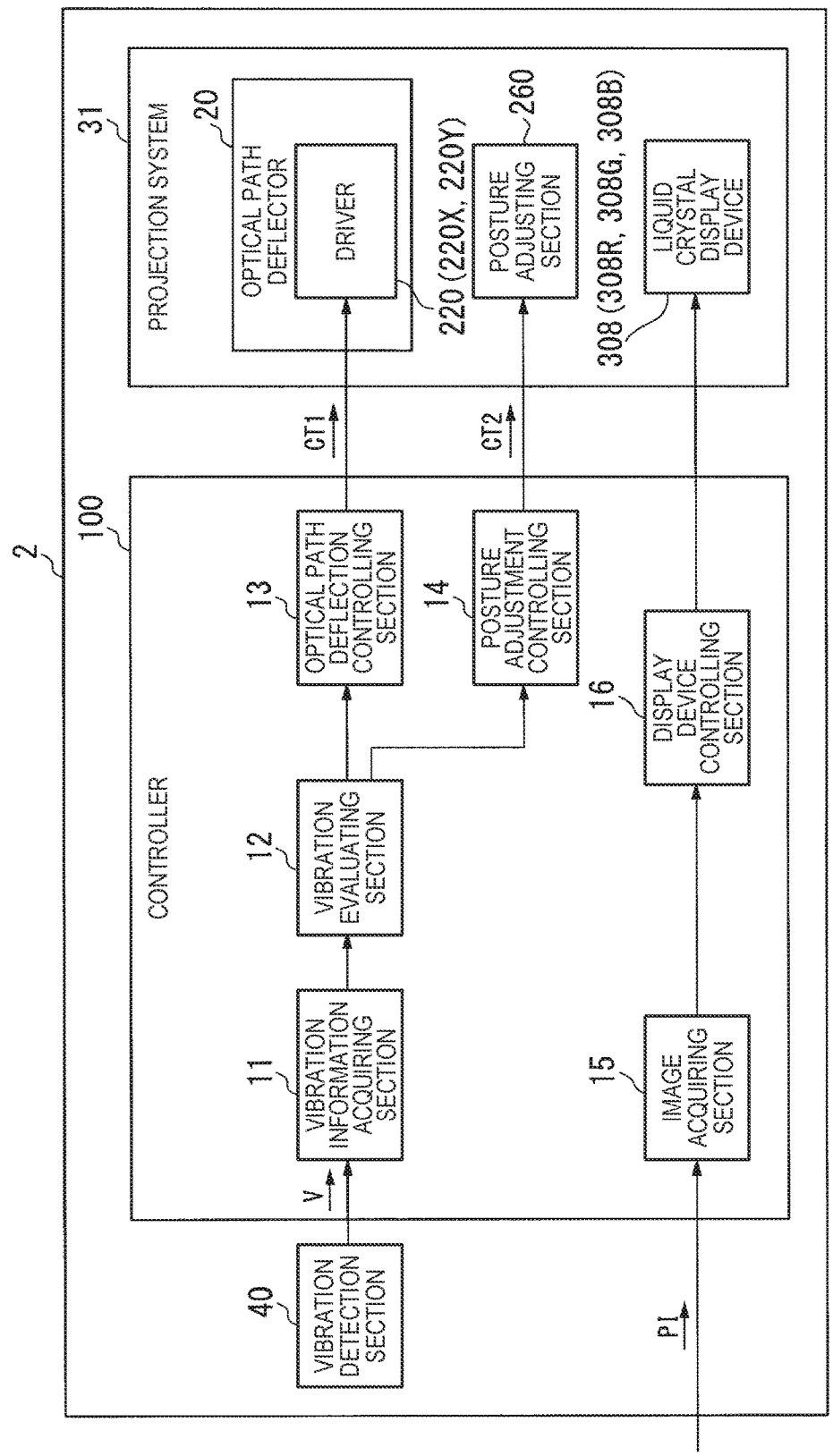
FIG. 9 shows an example of the configuration of a projector according to a second embodiment.

FIG. 9 shows an example of the configuration of a projector 2 according to the second embodiment.

The first embodiment has been described with reference to the case where when the vibration acting on the projector 1 is greater than or equal to the first threshold, the amount of change in the projection direction of the image light deflected by the optical path deflector 20 is changed on the basis of the vibration information V.

The second embodiment differs from the first embodiment in that in a case where vibration acting on the projector 2 is greater than or equal to a second threshold, the amount of change in the projection direction of the image light deflected by the optical path deflector 20 is changed and the posture of the optical path deflector 20 is changed on the basis of the vibration information V.

The same configurations as those in the first embodiment and the variation described above have the same reference characters and will not be described.

The projector 2 includes the vibration detecting section 40, a controller 100, and a projection system 31.

The controller 100 includes a CPU and includes, as functional sections of the CPU, the vibration information acquiring section 11, the vibration evaluating section 12, the optical path deflection controlling section 13, the image acquiring section 15, the display device controlling section 16, and a posture adjustment controlling section 14. The projection system 31 includes the optical path deflector 20, a posture adjusting section 260, and the liquid crystal display device 308.

Posture Adjusting Section

The posture adjusting section 260 is so disposed in a position downstream of the base 240 as to be in contact with the base 240.

The posture adjusting section 260 changes the posture of the optical path deflector 20 under the control of the controller 100. The posture adjusting section 260 is formed, for example, of a plurality of actuators. The posture adjusting section 260 changes (inclines) the posture of the optical path deflector 20 on the basis of a second control signal CT2 outputted from the controller 100.

Controller

The vibration evaluating section 12 determines the magnitude of the vibration represented by the vibration information V acquired from the vibration information acquiring section 11. The vibration evaluating section 12 evaluates whether or not the vibration represented by the vibration information V is greater than or equal to the first threshold. When the vibration represented by the vibration information V is smaller than the first threshold, the vibration evaluating section 12 does not output the vibration information V to the optical path deflection controlling section 13, as described above. In this case, the optical path deflection controlling section 13 controls the driver 220 in such a way that an image projected by the projector 2 is projected at high resolution.

When the vibration represented by the vibration information V is greater than or equal to the first threshold, the vibration evaluating section 12 further evaluates whether or not the vibration represented by the vibration information V is greater than or equal to the second threshold.

The second threshold is a threshold of the distance represented by the displacement information DP contained in the vibration information V. Specifically, the second threshold is a distance longer than the distance represented by the first threshold. Further, the second threshold is a distance on the basis of which the traveling direction of the image light deflected by the optical path deflector 20 and the magnitude of the deflection can be changed so as to change the position where the image light is projected on the projection surface 8.

The vibration evaluating section 12, when it determines that the vibration acting on the projector 2 is greater than or equal to the first threshold but smaller than the second threshold, outputs the vibration information V to the optical path deflection controlling section 13, and the optical path deflection controlling section 13 controls the drive operation performed on the driver 220 in such a way that the amount of change in the image light deflected by the optical path deflector 20 is so changed that the image light is projected in a position where the vibration acting on the projector 2 is canceled.

The vibration evaluating section 12, when it determines that the vibration acting on the projector 2 is greater than or equal to the second threshold, outputs the vibration information V to the optical path deflection controlling section 13 and the posture adjustment controlling section 14.

The posture adjustment controlling section 14 controls the posture adjusting section 260 on the basis of the vibration information V acquired from the vibration evaluating section 12 to change the posture of the optical path deflector 20.

The optical path deflection controlling section 13 changes the amount of change in the image light deflected by the optical path deflector 20 on the basis of the vibration information V acquired from the vibration evaluating section 12. Specifically, the optical path deflection controlling section 13 controls the drive operation performed on the driver 220 in such a way that the image light is projected, in accordance with the inclination of the optical path deflector 20 inclined by the posture adjusting section 260 and the inclination of the optical member 202 in the optical path deflector 20, in a position where the vibration acting on the projector 2 is canceled.

In the case where the magnitude of the vibration based on the vibration information V detected by the vibration detecting section 40 (magnitude according to displacement information DP) is greater than the second threshold, the image light can be moved by the distance according to the total inclination that is the combination of the inclination of the optical path deflector 20 itself, which is achieved when the posture adjusting section 260 changes the posture of the optical path deflector 20, and the inclination of the optical member 202 in the optical path deflector 20. In the present embodiment, for example, the image light is moved by inclining the optical path deflector 20 by a predetermined amount in a direction according to the direction information DR in the vibration information V and driving the driver 220 by the amount corresponding to the displacement information DR from which the distance over which the inclination causes the image light to move is subtracted. In other words, the optical path deflector 20 is so inclined as to move the image light by the amount equal to the second threshold, and the optical member 202 is inclined with respect to the optical path deflector 20 in such a way that the image light moves by the amount excluding the second threshold.

The optical path deflection controlling section 13 outputs, to the projection system 31, the first control signal CT1 that controls the drive operation performed on the driver 220 on the basis of the vibration information V.

The posture adjustment controlling section 14 outputs the second control signal CT2 that controls the action of the posture adjusting section 260 on the basis of the vibration information V.

Brief of Second Embodiment

As described above, a projector according to the present embodiment (projector 2 in an example of the second embodiment) includes a posture adjusting section (posture adjusting section 260 in an example of the second embodiment) that changes the posture of an optical path deflecting section (optical path deflector 20 in an example of the second embodiment) and a posture adjustment controlling section (posture adjustment controlling section 14 in an example of the second embodiment) that controls the posture adjusting section on the basis of vibration detected with a vibration detection section (vibration detection section 40 in an example of the second embodiment), and when the vibration is greater than or equal to a second threshold, an optical path deflection controlling section (optical path deflection controlling section 13 in an example of the second embodiment) controls the amount of change in the projection direction deflected by the optical path deflecting section on the basis of the vibration and the posture adjustment controlling section causes the posture adjusting section to change the posture of the optical path deflecting section on the basis of the vibration.

The projector 2 according to the second embodiment changes the control of the drive operation performed on the driver 220 and the control of the action of the posture adjusting section 260 on the basis of whether or not the vibration acting on the projector 2 is greater than or equal to the second threshold. When the vibration acting on the projector 2 is greater than or equal to the second threshold, the projector 2 changes the amount of change in the image light deflected by the optical path deflector 20 and changes the posture of the optical path deflector 20.

The projector 2 according to the present embodiment can therefore correct a blur of an image in accordance with large vibration acting on the projector 2.

Brief of First and Second Embodiments

Projectors according to the first and second embodiments (projector 1 in an example of the first embodiment, projector 2 in an example of the second embodiment) are each a projector that projects image light on a projection surface (projection surface 8 in examples of the first and second embodiments) and each include a light modulator (liquid crystal display device 308 in examples of the first and second embodiments) that modulates light emitted from a light source to form image light, an optical path deflecting section (optical path deflector 20 in an example of the first embodiment, optical path deflector 20 in an example of the second embodiment) that changes the projection direction of the image light modulated with the light modulator, a projection system (projection system 30 in an example of the first embodiment, projection system 31 in an example of the second embodiment) that projects the image light outputted from the optical path deflecting section on a projection surface, a vibration detecting section (vibration detecting section 40 in examples of the first and second embodiments) that detects vibration acting on the projector, and an optical path deflection controlling section (optical path deflection controlling section 13 in examples of the first and second embodiments) that controls the amount of change in the projection direction deflected by the optical path deflecting section on the basis of the vibration detected by the vibration detecting section.

The thus configured projector changes the amount of change in the projection direction of the image light deflected by the optical path deflecting section on the basis of the vibration acting on the projector. The projector can therefore correct a blur of an image in accordance with the vibration acting on the projector.

In the above description, in the case where the vibration acting on the projector 2 is greater than the second threshold, the amount of change in the image light deflected by the optical path deflector 20 is changed, and the posture of the optical path deflector 20 is changed, but not necessarily.

As another example, in the case where the vibration acting on the projector 2 is greater than the second threshold, only the position of the optical path deflector 20 may be moved.

In the above description, the vibration evaluating section 12 evaluates on the basis of the first threshold whether an image projected by the projector 2 is projected at high resolution or the position where the image light changed by the optical path deflector 20 is projected is moved in accordance with the vibration information V and further evaluates on the basis of the second threshold whether the amount of change in the image light deflected by the optical path deflector 20 is changed or and the amount of change in the image light deflected by the optical path deflector 20 is changed and the posture of the optical path deflector 20 is changed, but not necessarily.

As an another example, the vibration evaluating section 12 may evaluate on the basis of a threshold different from the first and second thresholds whether an image projected by the projector 2 is projected at high resolution or the optical path deflector 20 is moved in accordance with the vibration information V.

In the above description, the driver 220 is driven in accordance with the vibration information V, and the direction in which the image light moves when the optical path deflector 20 deflects the image light is opposite the direction represented by the direction information DR contained in the vibration information V, but not necessarily. The direction in which the image light moves may be any direction that allows vibration acting on the projector 1 and the projector 2 to be canceled. For example, the direction in which the image light moves may be a direction inclining with respect to the direction opposite the direction represented by the direction information DR.

In the above description, the driver 220 is driven in accordance with the vibration information V, and the distance over which the image light moves when the optical path deflector 20 deflects the image light is the distance represented by the displacement information DP contained in the vibration information V, but not necessarily. The distance over which the image light moves may be any distance that allows the vibration acting on the projector 2 to be canceled.

In each of the embodiments described above, the projector 1 and the projector 2 including the three liquid crystal display devices 308R, 308G, and 308B are presented by way of example. Instead, a projector based on DLP (Digital Light Processing: registered trademark of Texas Instruments Incorporated, USA) using a reflective light modulating device called a DMD (Digital Micromirror Device: registered trademark of Texas Instruments Incorporated, USA) may be used.

The projector 1 and the projector 2 have been described with reference to the case where they include the three liquid crystal display devices 308R, 308G, and 308B, which are transmissive light modulators, but not necessarily. Each of the projector 1 and the projector 2 may include reflective light modulators.

Each portion provided in the projector 1 and the projector 2 according to the embodiments described above may be achieved by dedicated hardware or may be achieved by a memory and a microprocessor.

Each portion provided in the projector 1 and the projector 2 may be formed of a memory and a CPU (central processing unit), and the function of each portion provided in the projector 1 and the projector 2 may be achieved by loading a program for achieving the function into the memory and executing the program.

A program for achieving the function of each portion provided in the projector 1 and the projector 2 may be recorded on a computer readable recording medium, the program recorded on the recording medium may be read by a computer system, and the read program may be executed to carry out a variety of processes. The "computer system" used herein is assumed to include an OS and hardware, such as a peripheral apparatus.

The "computer system" is assumed to include a website providing environment (or website displaying environment) in a case where the computer system uses the WWW system.

The "computer readable recording medium" refers to a portable medium, such as a flexible disk, a magneto-optical disk, a ROM, and a CD-ROM, and a storage device, such as a hard disk drive built in the computer system. Further, the "computer readable recording medium" is assumed to encompass a component that dynamically holds a program for a short period, such as a communication line in a case where a program is transmitted over the Internet or any other network or a telephone circuit or any other communication circuit and a component that holds a program for a fixed period, such as a volatile memory in a computer system that works as a server or a client in the case described above. The program described above may instead be a program that achieves part of the function described above or a program that achieves the function described above when combined with a program having already been stored in the computer system.

The embodiments of the invention have been described in detail with reference to the drawings, but the specific configurations are not limited to those in the embodiments, and a change can be made thereto as appropriate to the extent that the change does not depart from the substance of the invention. The configurations described in the above embodiments may also be combined with each other.

What is claimed is:

1. A projector that projects image light on a projection surface, the projector comprising:
   a light modulator that modulates light emitted from a light source to form the image light;
   an optical path deflecting section that changes a projection direction of the image light modulated with the light modulator;
   a projection system that projects the image light outputted from the optical path deflecting section on the projection surface;
   a vibration detecting section that detects vibration acting on the projector; and
   an optical path deflection controlling section that controls an amount of change in the projection direction deflected by the optical path deflecting section based on the vibration detected by the vibration detection section when the vibration detecting section detects that a current vibration is greater than a first threshold that is greater than no vibration,
   wherein the optical path deflection controlling section controls the amount of change in the projection direction deflected by the optical path deflecting section based on the vibration in a case where the vibration is greater than or equal to the first threshold, whereas the optical path deflecting section changes the projection direction of the image light such that it alternates between a first direction and a second direction in a case where the vibration is smaller than the first threshold.

2. The projector according to claim 1, wherein the optical path deflecting section includes an optical member that deflects light in accordance with a posture of the optical member, and a driver that changes the posture of the optical member.

3. The projector according to claim 2, further comprising a posture adjusting section that changes a posture of the optical path deflecting section based on the vibration in a case where the vibration is greater than or equal to a second threshold.

* * * * *